United States Patent [19]
Powell et al.

[11] Patent Number: 6,106,740
[45] Date of Patent: Aug. 22, 2000

[54] NON-AZEOTROPIC REFRIGERANT COMPOSITION OF $CO_2$, R-125, R-143A AND R-22

[75] Inventors: Richard Llewellyn Powell, Tarporley; Stuart Corr, Warrington; Frederick Thomas Murphy, Frodsham; James David Morrison, Northwich, all of United Kingdom

[73] Assignee: Imperial Chemical Industries PLC, United Kingdom

[21] Appl. No.: 09/011,728

[22] PCT Filed: Aug. 12, 1996

[86] PCT No.: PCT/GB96/01961

§ 371 Date: Feb. 18, 1998

§ 102(e) Date: Feb. 18, 1998

[87] PCT Pub. No.: WO97/07182

PCT Pub. Date: Feb. 27, 1997

[30] Foreign Application Priority Data

Aug. 18, 1995 [GB] United Kingdom .................... 9516909

[51] Int. Cl.$^7$ ...................................................... C09K 5/04
[52] U.S. Cl. .................. 252/67; 62/114; 62/502
[58] Field of Search ................................. 252/67; 62/114, 62/502

[56] References Cited

U.S. PATENT DOCUMENTS

| | | | |
|---|---|---|---|
| 4,943,388 | 7/1990 | Shankland et al. | 252/69 |
| 5,169,873 | 12/1992 | Behme et al. | 521/114 |
| 5,277,834 | 1/1994 | Bivens et al. | 252/67 |
| 5,458,798 | 10/1995 | Lunger et al. | 252/67 |
| 5,736,062 | 4/1998 | Basile et al. | 252/67 |
| 5,736,063 | 4/1998 | Richard et al. | 252/67 |

FOREIGN PATENT DOCUMENTS

| | | |
|---|---|---|
| 0 638 623 | 2/1995 | European Pat. Off. . |
| 4116274 | 11/1992 | Germany . |
| 63-105088 | 5/1988 | Japan . |
| 92/16597 | 10/1992 | WIPO . |
| 93/07231 | 4/1993 | WIPO . |

*Primary Examiner*—Christine Skane

[57] ABSTRACT

A non-azeotropic refrigerant is described comprising (A) carbon dioxide ($CO_2$), (B) pentafluoroethane (R-125), (C) 1,1,1-trifluoroethane (R-143a) and (D) chlorodifluoromethane (R-22).

11 Claims, No Drawings

NON-AZEOTROPIC REFRIGERANT COMPOSITION OF $CO_2$, R-125, R-143A AND R-22

The present invention relates to non-azeotropic refrigerant compositions and more particularly to non-azeotropic refrigerant compositions which can be used in the low temperature refrigeration applications currently satisfied by refrigerant R-502 which is an azeotropic mixture of chlorodifluoromethane (refrigerant R-22) and chloropentafluoroethane (refrigerant R-115).

Heat transfer devices of the mechanical compression type such as refrigerators, freezers, heat pumps and air conditioning systems are well known. In such devices a refrigerant liquid of a suitable boiling point evaporates at low pressure taking heat from a surrounding heat transfer fluid. The resulting vapour is then compressed and passes to a condenser where it condenses and gives off heat to another heat transfer fluid. The condensate is then returned through an expansion valve to the evaporator so completing the cycle. The mechanical energy required for compressing the vapour and pumping the liquid may be provided by an electric motor or an internal combustion engine.

In addition to having a suitable boiling point and a high latent heat of vaporisation, the properties preferred of a refrigerant include low toxicity, non-flammability, non-corrosivity, high stability and freedom from objectionable odour.

Hitherto, heat transfer devices have tended to use fully and partially halogenated chlorofluorocarbon refrigerants such as trichlorofluoromethane (refrigerant R-11), dichlorodifluoromethane (refrigerant R-12), chlorodifluoromethane (refrigerant R-22) and the azeotropic mixture of chlorodifluoromethane and chloropentafluoroethane (refrigerant R-115); the azeotrope being refrigerant R-502. Refrigerant R-502, for example, has been widely used in low temperature refrigeration applications.

However, the fully halogenated chlorofluorocarbons in particular have been implicated in the destruction of the earth's protective ozone layer and as a result the use and production thereof has been limited by international agreement.

Whilst heat transfer devices of the type to which the present invention relates are essentially closed systems, loss of refrigerant to the atmosphere can occur due to leakage during operation of the equipment or during maintenance procedures. It is important, therefore, to replace fully halogenated chlorofluorocarbon refrigerants by materials having low or zero ozone depletion potentials.

In addition to the possibility of ozone depletion, it has been suggested that significant concentrations of chlorofluorocarbon refrigerants in the atmosphere might contribute to global warming (the so-called greenhouse effect). It is desirable, therefore, to use refrigerants which have relatively short atmospheric lifetimes as a result of their ability to react with other atmospheric constituents such as hydroxyl radicals.

Replacements for some of the chlorofluorocarbon refrigerants presently in use have already been developed. These replacement refrigerants tend to comprise selected hydrofluoroalkanes, i.e. compounds which contain only carbon, hydrogen and fluorine atoms in their structure. Thus, refrigerant R-12 is generally being replaced by 1,1,1,2-tetrafluoroethane (R-134a).

Although suitable replacement refrigerants are available, there is always a need for new refrigerants having a low or zero ozone depletion potential that are capable of replacing the chlorofluorocarbon refrigerants presently in use such as R-502. Furthermore, very real benefits could be realised by a new replacement refrigerant having a higher refrigeration capacity than the replacement refrigerants known in the art.

The present invention provides a non-azeotropic refrigerant composition comprising a mixture of compounds having low or zero ozone depletion potentials which can be used in the low temperature refrigeration applications currently satisfied by refrigerant R-502. The non-azeotropic refrigerant composition of the invention can exhibit an advantageously high refrigeration capacity.

According to the present invention there is provided a non-azeotropic (zeotropic) refrigerant composition comprising:
(A) carbon dioxide ($CO_2$);
(B) pentafluoroethane (R-125);
(C) 1,1,1-trifluoroethane (R-143a); and
(D) chlorodifluoromethane (R-22)

The zeotropic refrigerant composition of the invention comprises four separate components.

The first component (component (A)) is carbon dioxide ($CO_2$) which exhibits a low temperature refrigeration action subliming at around $-78.5°$ C. The second component (component (B)) is pentafluoroethane (R-125) which has a boiling point of around $-48.5°$ C. The third component (component (C)) is 1,1,1-trifluoroethane (R-143a) which has a boiling point of around $-47.6°$ C. The fourth component (component (D)) is chlorodifluoromethane (R-22) which has a boiling point of around $-40.8°$ C.

The amounts of the various components in the refrigerant composition may be varied within wide limits, but typically the refrigerant composition will comprise from 1 to 20% by weight $CO_2$, from 1 to 20% by weight R-125, from 30 to 60% by weight R-143a and from 30 to 60% by weight R-22.

A preferred refrigerant composition of the invention in terms of its suitability as a replacement for refrigerant R-502 is one comprising from 1 to 15% by weight $CO_2$, from 1 to 15% by weight R-125, from 35 to 55% by weight R-143a and from 35 to 55% by weight R-22.

A particularly preferred refrigerant composition of the invention in terms of its suitability as a replacement for refrigerant R-502 is one comprising from 2 to 10% by weight $CO_2$, from 4 to 10% by weight R-125, from 40 to 50% by weight R-143a and from 40 to 50% by weight R-22.

The refrigerant composition of the invention may also be combined with one or more hydrocarbon compounds in an amount which is sufficient to allow the composition to transport a mineral oil or alkyl benzene type lubricant around a refrigeration circuit and return it to the compressor. In this way, inexpensive lubricants based on mineral oils or alkyl benzenes may be used to lubricate the compressor.

Suitable hydrocarbons for use with the refrigerant composition of the invention are those containing from 2 to 6 carbon atoms, with hydrocarbons containing from 3 to 5 carbon atoms being preferred. Propane and pentane are particularly preferred hydrocarbons, with pentane being especially preferred.

Where a hydrocarbon is combined with the refrigerant composition of the invention, it will preferably be present in an amount of from 1 to 10% by weight on the total weight of the refrigerant composition.

The refrigerant composition of the invention may also be used in combination with the types of lubricants which have been specially developed for use with hydrofluorocarbon based refrigerants. Such lubricants include those comprising a polyoxyalkylene glycol base oil. Suitable polyoxyalkylene glycols include hydroxyl group initiated polyoxyalkylene glycols, e.g. ethylene and/or propylene oxide oligomers/polymers initiated on mono- or polyhydric alcohols such as methanol, butanol, pentaerythritol and glycerol. Such polyoxyalkylene glycols may also be end-capped with suitable terminal groups such as alkyl, e.g. methyl groups. Another class of lubricants which have been developed for use with hydrofluorocarbon based refrigerants and which may be used in combination with the present refrigerant compositions are those comprising a neopentyl polyol ester base oil derived from the reaction of at least one neopentyl polyol and at least one aliphatic carboxylic acid or an esterifiable derivative thereof. Suitable neopentyl polyols for the formation of the ester base oil include pentaerythritol, polypentaerythritols such as di- and tripentaerythritol, trimethylol alkanes such as trimethylol ethane and trimethylol propane, and neopentyl glycol. The esters may be formed with linear and/or branched aliphatic carboxylic acids, such as linear and/or branched alkanoic acids. Preferred acids are selected from the $C_{5-8}$, particularly the $C_{5-7}$, linear alkanoic acids and the $C_{5-10}$, particularly the $C_{5-9}$, branched alkanoic acids. A minor proportion of an aliphatic polycarboxylic acid, e.g. an aliphatic dicarboxylic acid, may also be used in the synthesis of the ester in order to increase the viscosity thereof. Usually, the amount of the carboxylic acid(s) which is used in the synthesis will be sufficient to esterify all of the hydroxyl groups contained in the polyol, although residual hydroxyl functionality may be acceptable.

The zeotropic refrigerant composition of the present invention may be used to provide the desired cooling in heat transfer devices such as low temperature refrigeration systems by a method which involves condensing the refrigerant composition and thereafter evaporating it in a heat exchange relationship with a heat transfer fluid to be cooled. In particular, the refrigerant composition of the invention may be employed as a replacement for refrigerant R-502 in low temperature refrigeration applications.

The present invention is now illustrated but not limited with reference to the following example.

EXAMPLE 1

The performance of three refrigerant compositions of the invention in a low temperature refrigeration cycle was investigated using standard refrigeration cycle analysis techniques in order to assess the suitability thereof as a replacement for R-502. The following refrigerant compositions were subjected to the cycle analysis:

(1) A composition comprising 2% by weight $CO_2$, 6.9% by weight R-125, 45.1% by weight R-143a and 46% by weight R-22.

(2) A composition comprising 5% by weight $CO_2$, 6.7% by weight R-125, 43.7% by weight R-143a and 44.6% by weight R-22.

(3) A composition comprising 10% by weight $CO_2$, 6.3% by weight R-125, 41.4% by weight R-143a and 42.3% by weight R-22.

The following operating conditions were used in the cycle analysis.

| | |
|---|---|
| Mean Evaporator Temperature: | −40° C. |
| Mean Condenser Temperature: | 40° C. |
| Amount of Superheat: | 10° C. |
| Amount of Subcooling: | 5° C. |
| Isentropic Compressor Efficiency: | 75% |
| Cooling Duty: | 1 kW |

The results of analysing the performance of the three refrigerant compositions in a low temperature refrigeration cycle using these operating conditions are given in Table 1.

The performance parameters of the refrigerant compositions which are presented in Table 1, i.e. condenser pressure, evaporator pressure, discharge temperature, refrigeration capacity (by which is meant the cooling duty achieved per unit swept volume of the compressor), coefficient of performance (COP) (by which is meant the ratio of cooling duty (refrigeration effect) achieved to mechanical energy supplied to the compressor), and the glides in the evaporator and condenser (the temperature range over which the refrigerant composition boils in the evaporator and condenses in the condenser), are all art recognised parameters.

The performance of refrigerant R-502 under the same operating conditions is also shown in Table 1 by way of comparison.

It is apparent from Table 1 that the refrigerant compositions of the invention exhibited higher refrigeration capacities than refrigerant R-502 and that the refrigeration capacity increased as the $CO_2$ content in the composition increased. It is also apparent from the results given in Table 1 that the performance of the refrigerant composition of the invention in a low temperature refrigeration cycle is such that it could make an acceptable replacement for refrigerant R-502.

TABLE 1

| Refrigerant<br>% by weight | R502<br>100 | $CO_2$/125/143a/22<br>2/6.9/45.1/46 | $CO_2$/125/143a/22<br>5/6.7/43.7/44.6 | $CO_2$/125/143a/22<br>10/6.3/41.4/42.3 |
|---|---|---|---|---|
| Evaporator Pressure (bar) | 1.31 | 1.27 | 1.38 | 1.57 |
| Condenser Pressure (bar) | 16.82 | 18.34 | 20.34 | 23.63 |
| Discharge Temperature (° C.) | 88.8 | 97.3 | 103 | 111.4 |
| Coefficient of Performance (COP) | 1.33 | 1.35 | 1.34 | 0.99 |
| COP Relative to R502 | 1 | 1.01 | 1.01 | 1.32 |
| Refrigeration Capacity (KJ/m$^3$) | 667 | 694 | 757 | 869 |
| Refrigeration Capacity Relative to R502 | 1 | 1.04 | 1.13 | 1.3 |
| Evaporator Glide (° C.) | 0 | 1 | 2.1 | 4.1 |
| Condenser Glide (° C.) | 0 | 3.4 | 7 | 11.2 |

We claim:

1. A non-azeotropic refrigerant composition comprising:
(A) carbon dioxide ($CO_2$);
(B) pentafluoroethane (R-125);
(C) 1,1,1-trifluoroethane (R-143a); and
(D) chlorodifluoromethane (R-22).

2. A non-azeotropic refrigerant composition as claimed in claim 1 comprising from 1 to 20% by weight $CO_2$, from 1 to 20% by weight R-125, from 30 to 60% by weight R-143a and from 30 to 60% by weight R-22.

3. A non-azeotropic refrigerant composition as claimed in claim 2 comprising from 1 to 15% by weight $CO_2$, from 1 to 15% by weight R-125, from 35 to 55% by weight R-143a and from 35 to 55% by weight R-22.

4. A non-azeotropic refrigerant composition as claimed in claim 3 comprising from 2 to 10% by weight $CO_2$, from 4 to 10% by weight R-125, from 40 to 50% by weight R-143a and from 40 to 50% by weight R-22.

5. A non-azeotropic refrigerant composition as claimed in claim 1 which additionally comprises at least one hydrocarbon.

6. A non-azeotropic refrigerant composition as claimed in claim 5, wherein the at least one hydrocarbon contains from 2 to 6 carbon atoms.

7. A non-azeotropic refrigerant composition as claimed in claim 6, wherein the at least one hydrocarbon is selected from propane and pentane.

8. A non-azeotropic refrigerant composition as claimed in claim 6, wherein the hydrocarbon is present in an amount of from 1 to 10% by weight on the total weight of the refrigerant composition.

9. A heat transfer device comprising an evaporator, a compressor, a condensor and expansion means which contains as the refrigerant a non-azeotropic refrigerant composition as claimed in claim 1.

10. A low temperature refrigeration system which comprises an evaporator, a compressor, a condensor and expansion means and which contains as the refrigerant a non-azeotropic refrigerant composition as claimed in claim 1.

11. A method for providing cooling which comprises condensing a non-azeotropic refrigerant composition as claimed in claim 1 and thereafter evaporating it in a heat exchange relationship with a heat transfer fluid to be cooled.

* * * * *